United States Patent [19]

Kato

[11] Patent Number: 5,854,159
[45] Date of Patent: Dec. 29, 1998

[54] ALUMINA SINTERED BODIES AND METHOD FOR PRODUCING THE SAME

[75] Inventor: Shigeki Kato, Nagoya, Japan

[73] Assignee: NGK Insulators, Ltd., Japan

[21] Appl. No.: 824,957

[22] Filed: Mar. 27, 1997

[30] Foreign Application Priority Data

Mar. 26, 1996 [JP] Japan ................................. 8-076943

[51] Int. Cl.$^6$ .................................................. C04B 35/10
[52] U.S. Cl. ........................ 501/127; 501/128; 501/125; 501/153; 423/625; 423/626; 264/56; 264/63
[58] Field of Search ................................. 501/125, 127, 501/128, 153; 423/625, 626; 264/56, 63

[56] References Cited

U.S. PATENT DOCUMENTS

| | | | |
|---|---|---|---|
| 4,892,850 | 1/1990 | Hori | 501/127 |
| 5,382,556 | 1/1995 | Takahashi et al. | 501/153 |
| 5,593,468 | 1/1997 | Khaund et al. | 501/127 |

FOREIGN PATENT DOCUMENTS 2 087 854  6/1982  United Kingdom .
2 108 949  5/1983  United Kingdom .

OTHER PUBLICATIONS

Database WPI, Week 7433, Derwent Publications Ltd., London, GB; AN 74–59430V, XP002035211 & SU 399 487 A (G.M. Shapiro et al.) *abstract* Feb. 15, 1974.

Database WPI, Week 9619, Derwent Publications Ltd., London. GB; AN 96–184573, XP002035201 & JP 08 059 338 A (Sumitomo Metal Ind., Ltd.), Mar. 5, 1996 *abstract*.

*Primary Examiner*—Michael Marcheschi
*Attorney, Agent, or Firm*—Parkhurst & Wendel

[57] ABSTRACT

An alumina sintered body containing, as impurities, sodium oxide, potassium oxide, silicon oxide, calcium oxide, ferric oxide and titanium oxide in a total amount in the range from 100 to 10000 ppm, in which a total amount of the sodium oxide and potassium oxide based on the total amount of the impurities is not more than 4 wt. %. In the manufacture of the sintered body, its starting powder is admixed with at least an acid compound to produce metal salts by a reaction of the acid compound with metals contained in the starting powder and the resulting metal salts are removed.

4 Claims, No Drawings

ALUMINA SINTERED BODIES AND METHOD FOR PRODUCING THE SAME

BACKGROUND OF THE INVENTION

1. Field of the Invention

The present invention relates to alumina sintered bodies which are useful as parts, etc. of apparatuses for producing semiconductors, and a method for producing the same.

2. Description of Related Art

In the semiconductor-producing apparatuses, halogenous corrosive gases are used as etching gas, cleaning gas or the like. Since the parts of these apparatuses are exposed to a corrosive gas, such as $ClF_3$, they are required to be corrosion-resistant against such a gas.

As such highly corrosion-resistant materials, densified alumina and aluminum nitride have been generally known.

On the other hand, it is particularly important to prevent the semiconductor-producing apparatuses from contamination with sodium and potassium, because inclusion of the sodium and potassium, even in a trace amount, would seriously affect the properties of semiconductor membranes.

However, as a matter of fact, it is difficult to provide alumina sintered bodies with high purity, from the following reasons:

Namely, it is necessary to use starting powder with ultra-high purity, in order to manufacture alumina sintered bodies having very small amounts of the sodium and potassium. However, the impurities contained in the starting powder actually commercially available for alumina sintered bodies are not on a satisfactorily low level.

Therefore, in order to decrease the sodium and potassium contents in the starting powder, it is necessary to conduct a particular treatment comprising the step of pulverizing to reduce the particle diameter of the starting powder. However, this treatment is so costly that practical application is hardly realizable. Moreover, the thus obtained fine particles are difficult to shape into shaped bodies and fire.

Consequently, it has been required to provide an alumina sintered body containing the sodium and potassium in as small an amount as possible at a low manufacturing cost.

SUMMARY OF THE INVENTION

It is, therefore, an object of the present invention to provide a novel alumina sintered body having very low sodium and potassium contents, at a low manufacturing cost.

It is another object of the present invention to provide a method for manufacturing the same.

According to the first aspect of the invention, there is the provision of an alumina sintered body characterized in that a total amount of sodium oxide, potassium oxide, silicon oxide, calcium oxide, ferric oxide and titanium oxide which are contained as impurities in the sintered body is in the range of from 100 to 10000 ppm, and a total amount of the sodium oxide and potassium oxide based on the total amount of the impurities is not more than 4% by weight.

Furthermore, the second aspect of the invention is a method of producing an alumina sintered body containing, as impurities, sodium oxide, potassium oxide, silicon oxide, calcium oxide, ferric oxide and titanium oxide in a total amount ranging from 100 to 10000 ppm, which method comprises the steps of: adding at least an acid compound to starting powder of the sintered body; reacting Na and K in the starting powder with the acid compound to produce metal salts; and removing the resulting metal salts.

Thus, in alumina sintered bodies containing, as impurities, sodium oxide, potassium oxide, silicon oxide, calcium oxide, ferric oxide and titanium oxide in a total amount ranging from 100 to 10000 ppm, the present inventors have succeeded in providing an alumina sintered body containing the sodium oxide and potassium oxide in a total amount of not more than 4% by weight based on the total amount of the impurities.

The sodium oxide, potassium oxide, silicon oxide, calcium oxide, ferric oxide and titanium oxide are generally contained as impurities in a high purity starting powder for alumina sintered bodies, usually in a total amount of not less than 100 ppm.

It is difficult to decrease every amount of these metal impurities. However, the starting powder containing the impurities in a total amount of not less than 100 ppm is of a generally commercially available grade buyable in the market at a reasonable price. Besides, as described below, by decreasing only sodium oxide and potassium oxide in the starting powder, a negative influence on the apparatuses can be diminished considerably.

From this point of view, it is more preferable that the total amount of the sodium oxide and potassium oxide is made to be not more than 2% by weight based on the total amount of the impurities. Additionally, a total amount of the sodium oxide and potassium oxide has no lower limit and may be substantially undetectable.

In order to manufacture such alumina sintered bodies, at least an acid compound is added to starting powder for an alumina sintered body, to produce metal salts by a reaction of the acid compound with sodium and potassium in the starting powder and the resulting metal salts are removed. In this case, it is preferred that the acid compound is added as a component of a shaping binder to the starting powder. Then, the mixture of the starting powder with the shaping binder is shaped. Examples of shaping processes include injection molding, pressure molding and cast molding.

According to the above manufacturing process, it s not necessary to employ an ultra-high purity powder riginally containing extremely small amounts of sodium nd potassium in order to produce alumina sintered bodies extremely low in sodium and potassium contents as aforementioned. It is preferred to employ commercially available alumina powder with purity of 99.5–99.9%.

The above starting powder may be either ungranulated or granulated. Ungranulated powder usually has an average particle diameter of about 0.5 μm and granulated one has that of about 100 μm.

Although the acid compound to be added to the starting powder is not specifically limited, it requires reactivity with sodium and potassium. Alternatively, it is most preferred to use, as the acid compound, a compound compatible with shaping binders, such as an organic carboxylic acid, because the thus added acid compound may be homogeneously dispersed in shaped bodies.

As the acid compound, organic carboxylic acids are preferred and, inter alia, oleic acid, elaidic acid, palmitic acid, hexadecenoic acid, heptadecenoic acid, nonadecenoic acid and the like are particularly preferred.

The content of the acid compound in the shaped body is preferred to be 0.2–2.0% by weight. Additionally, as the shaping binder, an appropriate binder may be selected depending on the shaping method.

For example, in injection molding, starting powder, an acid compound and a predetermined molding binder are mixed together, the mixture is kneaded, and the kneaded mass is shaped into a shaped body, followed by a dewaxing treatment. It is conjectured that the reaction of sodium and potassium in the shaped body with the acid compound proceeds in the dewaxing step, and thus metal salts are produced. The metal salts are removed in the dewaxing or firing stage.

The dewaxing temperature is usually about 500° C. During the dewaxing stage, the contents of the sodium oxide and potassium oxide are reduced to about a half of the contents of the sodium oxide and potassium oxide in the starting powder. The firing temperature is generally 1550°–1700° C. During the firing stage, the contents of the sodium oxide and potassium oxide are reduced to 1/5–1/20 of the contents of the sodium oxide and potassium oxide in the dewaxed body.

Examples of objects to which the alumina sintered body according to the present invention is applied include: a ceramic heater comprising an alumina substrate and a resistance heating element embedded therein; a ceramic electrostatic chuck comprising an alumina substrate and an electrode for electrostatic chuck embedded therein; a heater with an electrostatic chuck which comprises an alumina substrate and a resistance heating element embedded therein together with an electrode for electrostatic chuck; and an active type apparatus, such as a high-frequency generating electrode apparatus comprising an alumina substrate and a plasma generating electrode embedded therein.

Further examples include a dummy wafer, a shadow ring, a tube for generating high-frequency plasma, a dome for generating high-frequency plasma, a high-frequency transmittable window, an infrared ray transmittable window, a lift pin for supporting a semiconductor wafer, and a shower plate. Additionally, another example is an arm for holding the active type apparatus at a predetermined place in a semiconductor manufacturing apparatus.

DESCRIPTION OF THE PREFERRED EMBODIMENTS

The present invention will be explained in more detail hereinafter by way of example. The examples are not intended to limit the invention.

EXAMPLE 1

Granular powder comprising components in proportions as shown in Table 1 was prepared. In Table 1, the content of each metal impurity is shown by "ppm" transformed to oxide thereof.

56 vol. % of the granular powder and 44 vol. % of a shaping binder were mixed together. Particulars of the 44 vol. % shaping binder are: 31.0 vol. % of "SP-3035" (the trade name of paraffin wax made by Nippon Seiro Co., Ltd.); 9.0 vol. % of "HI-MIC-1070" (the trade name of MC wax made by Nippon Seiro Co., Ltd.); and 1.9 vol. % of "EVAFLEX 220" (the trade name of Ethylene Vinyl Acetate (EVA) made by Mitsui Polychemical Co., Ltd.); and 2.1 vol % of oleic acid (extra pure reagent) made by Katayama Kagaku Co., Ltd. 20 kg of the above mixture were mixed by means of a rocking mixing machine for 2 hours.

The thus obtained mixture was kneaded for 2 hours in a 10 liter pressure kneader. Then, the kneaded mass was shaped into pellets for injection molding, having a diameter of 4 mm and a length of 5 mm. Using these pellets with an in-line screw type injection molding machine, a plate-type shaped body 70 mm long, 70 mm wide and 6 mm thick was produced. This shaped body was heated at a temperature increasing rate of 2° C./hour up to a maximum temperature of 500° C. in the atmospheric environment, and held at 500° C. for 5 hours to provide a dewaxed body. The dewaxed body was isostatically pressed under a pressure of 1 ton/cm² to provide a shaped body. This shaped body was sintered at 1600° C. for 3 hours in the atmospheric environment.

The thus obtained alumina dewaxed body and the sintered body were chemically analyzed according to JCRS 104-1993, "Method for chemical analysis of alumina fine powder for use in fine ceramics" in Standards of Japanese Ceramics Association, and the weight proportion of each component was determined as shown in Table 1. The results are shown in Table 1, wherein each data is expressed by the "ppm" unit in principle. This alumina sintered body had a relative density of 98.5%.

EXAMPLE 2

An experiment was conducted in the same manner as Example 1. However, 56 vol. % of the aforementioned granular powder was mixed with 44 vol. % of the molding binder with particulars changed as follows: 32.0 vol. % of the paraffin wax, "SP-3035" made by Nippon Seiro Co., Ltd.; 9.1 vol. % of the MC wax, "HI-MIC-1070" made by Nippon Seiro Co., Ltd.; 1.9 vol. % of the ethylene vinyl acetate (EVA), "Evaflex 220" made by Mitsui Polychemical Co., Ltd.; and 1.0 vol. % of the aforementioned oleic acid. Namely, the proportion of oleic acid was decreased.

An alumina sintered body was produced in exactly the same manner as Example 1 except above mentioned change, and chemically analyzed with respect to each of components as shown in Table 1. The results are shown in Table 1. Additionally, this alumina sintered body had a relative density of 98.2%.

COMPARATIVE EXAMPLE

Granular powder comprising components in proportions as shown in Table 1 was prepared. With an oil pressure molding machine, this granular powder was shaped to produce a plate-like shaped body 70 mm long, 70 mm wide and 6 mm thick. This shaped body was isostatically pressed under a pressure of 1 ton/cm² to provide a CIP (cold isostatic pressing) shaped body. This CIP shaped body was sintered at 1600° C. for 3 hours in the atmospheric environment to provide an alumina sintered body.

The thus obtained sintered body was chemically analyzed. The results are shown in Table 1. This alumina sintered body had a relative density of 97.5%.

TABLE 1

| | Example 1 injection molding | | Example 2 injection molding | | Comparative Example pressure molding | Reference |
|---|---|---|---|---|---|---|
| | dewaxed body | sintered body | dewaxed body | sintered body | sintered body | granular powder |
| $Na_2O$ | 370 | 31 | 370 | 72 | 300 | 730 |
| $SiO_2$ | 1400 | 1500 | 1400 | 1500 | 1500 | 1400 |
| CaO | 350 | 399 | 340 | 404 | 389 | 350 |
| $K_2O$ | 160 | 5 | 160 | 11 | 108 | 170 |
| $Fe_2O_3$ | 120 | 167 | 130 | 165 | 97 | 100 |
| $TiO_2$ | 30 | 36 | 30 | 36 | 36 | 30 |
| Ratio of $Na_2O$ | 21.8 | 1.5 | 21.8 | 3.5 | 16.8 | — |

TABLE 1-continued

|  | Example 1 injection molding | | Example 2 injection molding | | Comparative Example pressure molding | Reference |
| --- | --- | --- | --- | --- | --- | --- |
|  | dewaxed body | sintered body | dewaxed body | sintered body | sintered body | granular powder |
| and K$_2$O (%) | | | | | | |

(Unit: ppm)

As is seen from Table 1, the alumina sintered body of Example 1 had Na$_2$O and K$_2$O contents extremely decreased as compared with the granular powder and, moreover, the contents of other metal impurities were somewhat increased. With respect to the alumina sintered body of Example 2, the same tendency was recognized. Thus, according to the present invention, the contents of only sodium and potassium that are particularly harmful can be decreased and, therefore, the present invention is extremely useful in industry.

Besides, when comparing Example 1 with Example 2, the sintered body of Example 2 contained sodium oxide and potassium oxide a little more than that of Example 1. The reason of the above is conjectured that the oleic acid content in the shaping binder in Example 2 was lower as compared with Example 1. In the alumina sintered body of the Comparative Example, the contents of Na$_2$O and K$_2$O were decreased as compared with the granular powder. However, it is not satisfactory as yet for application in the use requiring low alkaline materials, for example, semiconductor-manufacturing apparatus or the like.

As described above, according to the present invention, alumina sintered bodies having low sodium and potassium contents can be provided, without using starting powder comprising ultra-high purity particles, which are usable in semiconductor-manufacturing apparatuses and the like.

What is claimed is:

1. An alumina shaped sintered body for a semiconductor-producing apparatus, said body having a relative density of not less than 98.2% and comprising alumina and impurities, said impurities comprising sodium oxide, potassium oxide, silicon oxide, calcium oxide, ferric oxide and titanium oxide in a range from 100 to 10000 ppm, and a total amount of the sodium oxide and potassium oxide based on a total amount of said impurities is not more than 4% by weight.

2. The alumina shaped sintered body according to claim 1, wherein said total amount of the sodium oxide and potassium oxide is not more than 2% by weight based on said total amount of said impurities.

3. A method for producing an alumina sintered body comprising alumina and unavoidable impurities, said impurities comprising sodium oxide, potassium oxide, silicon oxide, calcium oxide, ferric oxide and titanium oxide in a total amount ranging from 100 to 10000 ppm, said method comprising the steps of:

adding an acid compound to starting powder of the sintered body;

reacting Na and K in the starting powder with the acid compound to produce metal salts; and heating and sintering the starting powder whereby the metal salts are removed.

4. The method according to claim 3, wherein the starting powder is admixed with at least the acid compound to produce a mixture, and the mixture is shaped thereafter.

* * * * *

UNITED STATES PATENT AND TRADEMARK OFFICE
CERTIFICATE OF CORRECTION

PATENT NO. : 5,854,159
DATED : December 29, 1998
INVENTOR(S) : Shigeki KATO

It is certified that error appears in the above-indentified patent and that said Letters Patent is hereby corrected as shown below:

On the title page, item [30] Foreign Application Priority Data: change "Mar. 26, 1996" to --Mar. 29, 1996--.

Signed and Sealed this

Eighteenth Day of May, 1999

Attest:

Q. TODD DICKINSON

*Attesting Officer*  *Acting Commissioner of Patents and Trademarks*